United States Patent
Roux et al.

(10) Patent No.: US 10,600,200 B2
(45) Date of Patent: Mar. 24, 2020

(54) METHOD FOR VIEWING A LASER SPOT

(71) Applicant: SAFRAN ELECTRONICS & DEFENSE, Boulogne Billancourt (FR)

(72) Inventors: Nicolas Roux, Boulogne Billancourt (FR); Philippe Foubert, Boulogne Billancourt (FR); Philippe Patry, Boulogne Billancourt (FR); Pierrick Guiset, Boulogne Billancourt (FR); Thierry Touati, Boulogne Billancourt (FR)

(73) Assignee: SAFRAN ELECTRONICS & DEFENSE, Boulogne Billancourt (FR)

( * ) Notice: Subject to any disclaimer, the term of this patent is extended or adjusted under 35 U.S.C. 154(b) by 296 days.

(21) Appl. No.: 15/745,881

(22) PCT Filed: Jul. 11, 2016

(86) PCT No.: PCT/EP2016/066409
§ 371 (c)(1),
(2) Date: Jan. 18, 2018

(87) PCT Pub. No.: WO2017/012899
PCT Pub. Date: Jan. 26, 2017

(65) Prior Publication Data
US 2018/0211409 A1    Jul. 26, 2018

(30) Foreign Application Priority Data
Jul. 21, 2015    (FR) ..................... 15 56900

(51) Int. Cl.
*G06K 9/00*    (2006.01)
*G06T 7/73*    (2017.01)
(Continued)

(52) U.S. Cl.
CPC ............. *G06T 7/73* (2017.01); *G06T 5/008* (2013.01); *G06T 5/20* (2013.01); *G06T 5/50* (2013.01);
(Continued)

(58) Field of Classification Search
CPC ...................................... G06T 7/73
(Continued)

(56) References Cited

U.S. PATENT DOCUMENTS

2014/0321753 A1    10/2014  Roux et al.

FOREIGN PATENT DOCUMENTS

EP    2 560 129 A1    2/2013
FR    2 982 393 A1    5/2013
(Continued)

OTHER PUBLICATIONS

Goudail et al; "Some practical issues in anomaly detection and exploitation of regions of interest in hyperspectral images;" Applied Optics; 2006; vol. 45; No. 21; pp. 5223-5236.
(Continued)

*Primary Examiner* — Stephen P Coleman
(74) *Attorney, Agent, or Firm* — Oliff PLC; R. Brian Drozd

(57) ABSTRACT

Method for viewing a laser spot included in a multispectral image representing an optical field composed of pixels including a plurality of components, the laser spot being produced by a laser pointer and having a wavelength taking values in a range of wavelengths dependent on operating temperatures of the laser pointer. The method includes: obtaining a multispectral image in which each component corresponds to the same instant of acquisition and represents a spectral band in a plurality of spectral bands covering continuously a spectral domain comprising said range of wavelengths; applying a contrast-accentuation procedure to
(Continued)

a subpart of the multispectral image comprising the laser spot in order to obtain a subpart in which a contrast between the laser spot and a background is improved; and generating an image allowing display of the laser spot using information obtained following the application of said procedure.

20 Claims, 4 Drawing Sheets

(51) Int. Cl.
*G06T 5/00* (2006.01)
*G06T 5/50* (2006.01)
*G06T 5/20* (2006.01)

(52) U.S. Cl.
CPC ............... *G06T 2207/10036* (2013.01); *G06T 2207/20021* (2013.01); *G06T 2207/20212* (2013.01); *G06T 2207/30212* (2013.01)

(58) Field of Classification Search
USPC ........................................................ 382/103
See application file for complete search history.

(56) References Cited

FOREIGN PATENT DOCUMENTS

| FR | 3 013 878 A1 | 5/2015 |
| WO | 2012/128862 A2 | 9/2012 |

OTHER PUBLICATIONS

Oct. 24, 2016 Search Report issued in International Patent Application No. PCT/EP2016/066409.

METHOD FOR VIEWING A LASER SPOT

The invention relates to a method for viewing a laser spot in a multispectral image representing a scene, and a device implementing said method.

It has become usual to use devices for generating a laser spot, or laser devices, such as for example laser designators or pointers, to designate objects or targets in scenes. A laser device produces a laser beam, continuously or intermittently with a predefined frequency, which, when it touches a designated object, produces a light point, referred to as a laser spot, visible in various spectral bands. Said spectral bands may comprise spectral bands situated in:

the visible domain (VIS) comprising wavelengths ranging from 0.38 to 0.78 micrometres (μm),
the near infrared (NIR) (0.78 to 1 μm)
the short-wavelength infrared (SWIR) (1 to 2.5 μm)
the medium-wavelength infrared (MWIR) (2.5 to 5 μm)
the long-wavelength infrared (LWIR) (5 to 14 μm)

A laser spot produced by a laser device can be viewed by an operator with the naked eye when it is situated in the visible domain, or using a suitable viewing system when the laser spot is situated in an infrared domain, such as for example an airborne observation system, digital binoculars, augmented-reality glasses or a digital viewfinder. In this case, an image of the scene comprising the laser spot is then supplied to the operator by the viewing system. It is known that good viewing of a laser spot is dependent on conditions of illumination of the scene being observed. Thus viewing a laser spot in an image poses few problems in an environment with low illumination, such as for example at night. On the other hand, such viewing may prove to be difficult in an environment subject to moderate to high illumination, such as for example in the daytime or in an environment illuminated by artificial lighting. Thus night-vision binoculars cannot be used during the day for detecting a laser spot. A laser spot may also be difficult to detect by systems using an unfiltered VNIR and/or SWIR channel in an environment subjected to moderate to strong lighting.

Moreover, many laser devices use a laser diode for generating a laser beam. The laser beam is generated with a wavelength dependent on characteristics of the laser diode. It is known that variations in operating temperature of a laser diode cause a drift in the wavelength of the laser beam (and therefore of the laser spot) produced by the laser diode. Conventional wavelengths λ of a laser beam generated by a laser diode are for example "0.808 μm". "0.830 μm", "0.852 μm" or "0.860 μm" at a temperature of 20° C. These wavelengths may vary by a value Δλ with respect to the wavelength λ in accordance with a linear law as a function of a variation in temperature ΔT with respect to the operating temperature of 20° C.

$$\Delta\lambda = \alpha \cdot \Delta T$$

where α is a constant ranging from 0.1 nanometres (nm)/° C. to 0.5 nm/° C. for laser diodes generating laser beams having a wavelength situated in the NIR domain or the SWIR domain.

However, a laser device comprising a laser diode may be used under highly variable temperature conditions ranging from −40° C. to 70° C., in particular when it is installed on an airborne device.

Moreover, aging of the laser diode may cause laser-beam generations no longer corresponding to a single wavelength but rather to a narrow band covering a plurality of wavelengths.

It then becomes difficult to define a viewing system suited to the laser spot generated by the laser device since this laser spot is not situated in a well-defined or even constant spectral band. Thus laser spot detection systems, for example based on an unfiltered video channel or on a filtered video channel (such as a VNIR/SWIR video channel), suitable for detecting a laser spot under given temperature conditions, may prove to be ineffective for other temperature conditions because of a drift in the wavelength of the laser spot.

It is desirable to overcome these drawbacks of the prior art.

It is in particular desirable to propose a method and device allowing effective viewing of a laser spot under illumination conditions corresponding to moderate to high illumination. It is also desirable for the method and device proposed to have constant efficacy despite drifts in wavelength of a laser beam produced by a laser device due to variations in operating temperatures of said laser device.

According to a first aspect of the invention, the invention relates to a method for viewing a laser spot included in a multispectral image, comprising a plurality of components and representing an optical field, the laser spot being produced by a laser device and having a wavelength taking values in a range of wavelengths dependent on operating temperatures of the laser device. The method comprises: obtaining a multispectral image in which each component corresponds to the same instant of acquisition and represents a spectral band in a plurality of spectral bands covering continuously a spectral domain comprising said range of wavelengths; applying a contrast-accentuation procedure to a first window corresponding to a subpart of the multispectral image comprising the laser spot, the contrast-accentuation procedure comprising: defining in the first window a first mask suitable for containing pixels of the multispectral image corresponding to the laser spot and a second mask suitable for containing pixels of the multispectral image not corresponding to the laser spot; and determining a vector representing a Fischer projection direction allowing to accentuate a contrast between the pixels of the first and second masks and applying a projection according to said vector to the first window in order to obtain a second window; if the laser spot appears in the second window, selecting a first spectral band offering the best contrast between the pixels of the first and second masks and forming a third window from a component of the first window corresponding to the first spectral band selected; generating an image allowing display of the laser spot by inserting the third window at a position corresponding to the first window in a receiving image representing the optical field.

Said method therefore allows to improve the viewing of the laser spot despite drifts in the wavelength of the laser spot due to variations in temperature and whatever the illumination conditions.

According to one embodiment, a comparison of a value representing a contrast between the pixels of the first and second masks in the second window with a first threshold allows to determine whether the laser spot appears in the second window.

According to one embodiment, values representing a contrast between the pixels of the first and second masks in each spectral band are used for selecting the spectral band offering the best contrast between the pixels of the first and second masks, said values representing a contrast comprising values of coordinates of said vector.

According to one embodiment, the values of coordinates of said vector are values of coordinates normalized over a predefined range of values.

According to one embodiment, said values representing a contrast further comprise signal-to-noise ratio values calculated for each spectral band.

According to one embodiment, a selection value is calculated for each spectral band from each value representing a contrast corresponding to said spectral band, the first spectral band being selected by taking a spectral band from the plurality of spectral bands associated with a highest selection value among the selection values calculated.

According to one embodiment, the method comprises selecting a second spectral band, said second spectral band being associated with a contrast value between the pixels of the first and second masks lower than a second threshold and forming a fourth window from a component of the first window corresponding to the second spectral band selected, the image allowing viewing of the laser spot being generated by inserting the third or fourth window in a receiving image representing the optical field.

According to one embodiment, the multispectral image is generated from a plurality of thumbnails representing the optical field having the same acquisition instant and harmonised spatially, each thumbnail corresponding to a spectral band from the plurality of spectral sub-bands.

According to one embodiment, at least two thumbnails from the plurality of thumbnails correspond to the same spectral band and represent a light beam corresponding to said spectral band polarised according to a different polarisation, so that, when the first spectral band offering the best contrast between the pixels of the first and second masks is selected, the polarisation offering the best contrasts between the pixels of the first and second masks is also selected.

According to one embodiment, the contrast-accentuation procedure is applied to a plurality of first windows corresponding to different subparts of the multispectral image, at least one first window from said plurality comprising the laser spot, and in that a second window is selected in accordance with a predefined criterion from the second windows obtained during each application of the contrast-accentuation procedure, the second window selected being used for selecting the first spectral band.

According to one embodiment, at least one characteristic of the first spectral band makes it possible to determine a laser device type.

According to a second aspect of the invention, the invention relates to a method for viewing a laser spot included in multispectral images acquired with a predefined image frequency, characterised in that the method comprises: implementing the method according to the first aspect for each multispectral image.

According to one embodiment, a position of at least one first window is defined in a multispectral image, referred to as the current image, according to a position of a second window in which the laser spot appears in a multispectral image preceding the current image.

According to one embodiment, a frequency of the laser spot is determined over a plurality of successive multispectral images, the frequency of the laser spot being used for determining the type of laser device.

According to one embodiment, the image allowing viewing of the laser spot is generated by alternating an insertion of the third or fourth window in a receiving image representing the optical field with a predefined alternation frequency less than or equal to the predefined image frequency.

According to a third aspect of the invention, the invention relates to a device allowing viewing of a laser spot included in a multispectral image, comprising a plurality of components and representing an optical field, the laser spot being produced by a laser device and having a wavelength taking values in a range of wavelengths dependent on operating temperatures of the laser device. The device comprises: obtaining means for obtaining a multispectral image in which each component corresponds to the same acquisition instant and represents a spectral band in a plurality of spectral bands covering continuously a spectral domain comprising said range of wavelengths; application means for applying a contrast-accentuation procedure to a first window corresponding to a subpart of the multispectral image comprising the laser spot, said application means comprising; definition means for defining in the first window a first mask suitable for containing pixels of the multispectral image corresponding to the laser spot and a second mask suitable for containing pixels of the multispectral image corresponding to the laser spot and a second mask suitable for containing pixels of the multispectral image not corresponding to the laser spot; and determination means for determining a vector representing a Fischer projection direction making it possible to accentuate a contrast between the pixels of the first and second masks and means for applying a projection according to said vector to the first window in order to obtain a second window; selection means for selecting a first spectral band offering the best contrast between the pixels of the first and second masks and means for forming a third window from a component of the first window corresponding to the first spectral band selected; and generation means for generating an image allowing viewing of the laser spot by inserting the third window at a position corresponding to the first window in a receiving image representing the optical field.

According to a fourth aspect of the invention, the invention relates to a computer program, comprising instructions for the implementation, by a device, of the method according to the first aspect or the second aspect, when said program is executed by a processor of said device.

According to a fifth aspect of the invention, the invention relates to storage means storing a computer program comprising instructions for the implementation, by a device, of the method according to the first or second aspects, when said program is executed by a processor of said device.

The features of the invention mentioned above, as well as others, will emerge more clearly from a reading of the following description of an example embodiment, said description being given in relation to the accompanying drawings, among which:

The invention is described hereinafter in a context of a viewing system comprising a housing integrating an image-acquisition device, a processing module, an image-viewing device such as a screen and a laser device. The invention also applies in a broader context. The invention applies in particular when the image-acquisition device, the image-viewing device, the processing module and the laser device of the viewing system are separate elements distant geographically, each device being able to be fixed or movable and manipulated by different operators. The operators may collaborate in order to designate and view a target, or an operator manipulating the image-acquisition device may aim said device on a laser spot generated by a laser device manipulated by another operator with whom he is not collaborating.

Figure 1:
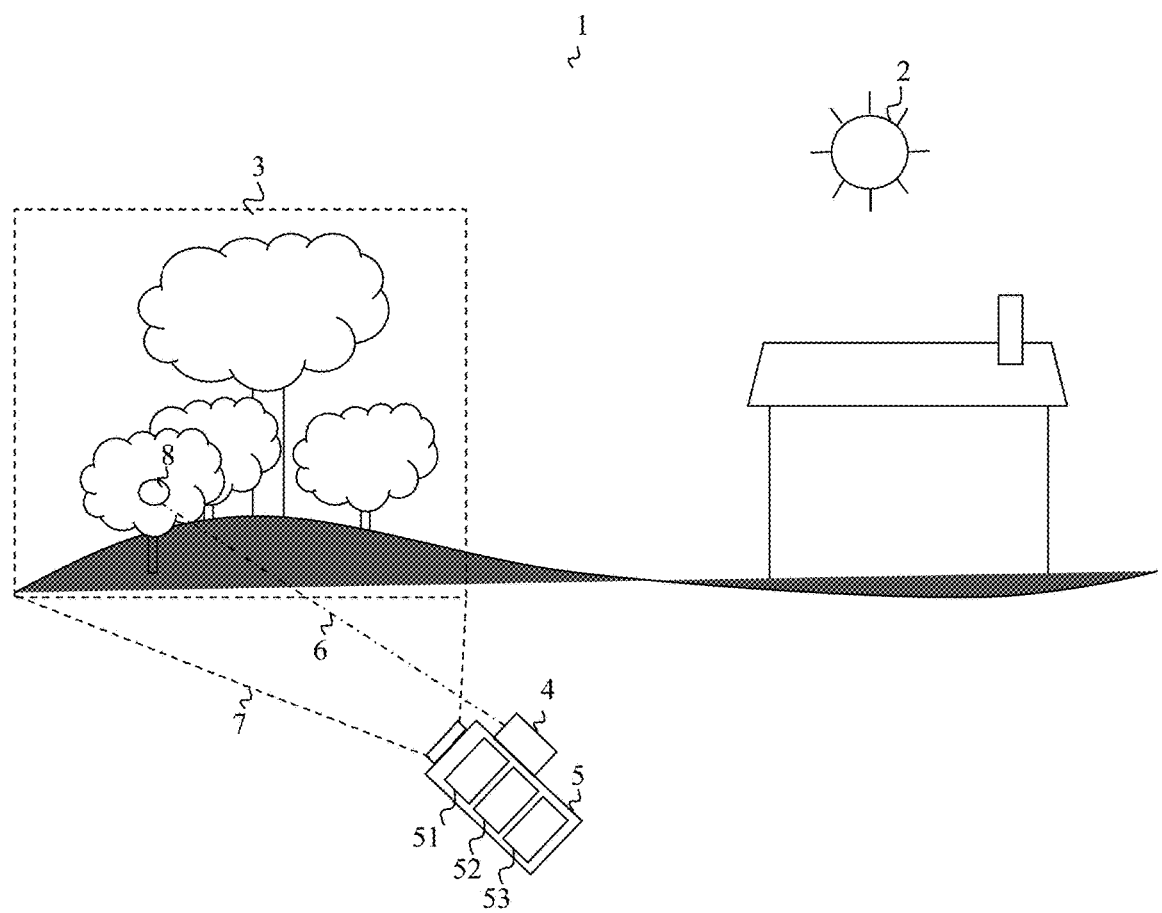
FIG. 1 illustrates schematically an example of context in which the invention can be implemented.

FIG. 1 illustrates schematically an example of context in which the invention can be implemented. An operator (not shown) observes a scene 1 illuminated by moderate to high illumination (represented by the sun 2) from a viewing system 5. The viewing system 5 comprises an image-acquisition device 51, a processing module 52 and an image-viewing device 53. The image-acquisition device 51 is for example of the video acquisition system type and allows to acquire a plurality of images 3 representing an optical field 7. The optical field 7 is narrow, i.e. the optical field has an angle of 2° to 5°. The plurality of images 3 is for example acquired at an image frequency of 25 to 30 images per second. Each image 3 supplied by the image-acquisition device 51 is a multispectral image, the characteristics of which are detailed in relation to FIG. 3A. The image-acquisition device 51 is detailed in relation to FIG. 2A.

Figure 4:
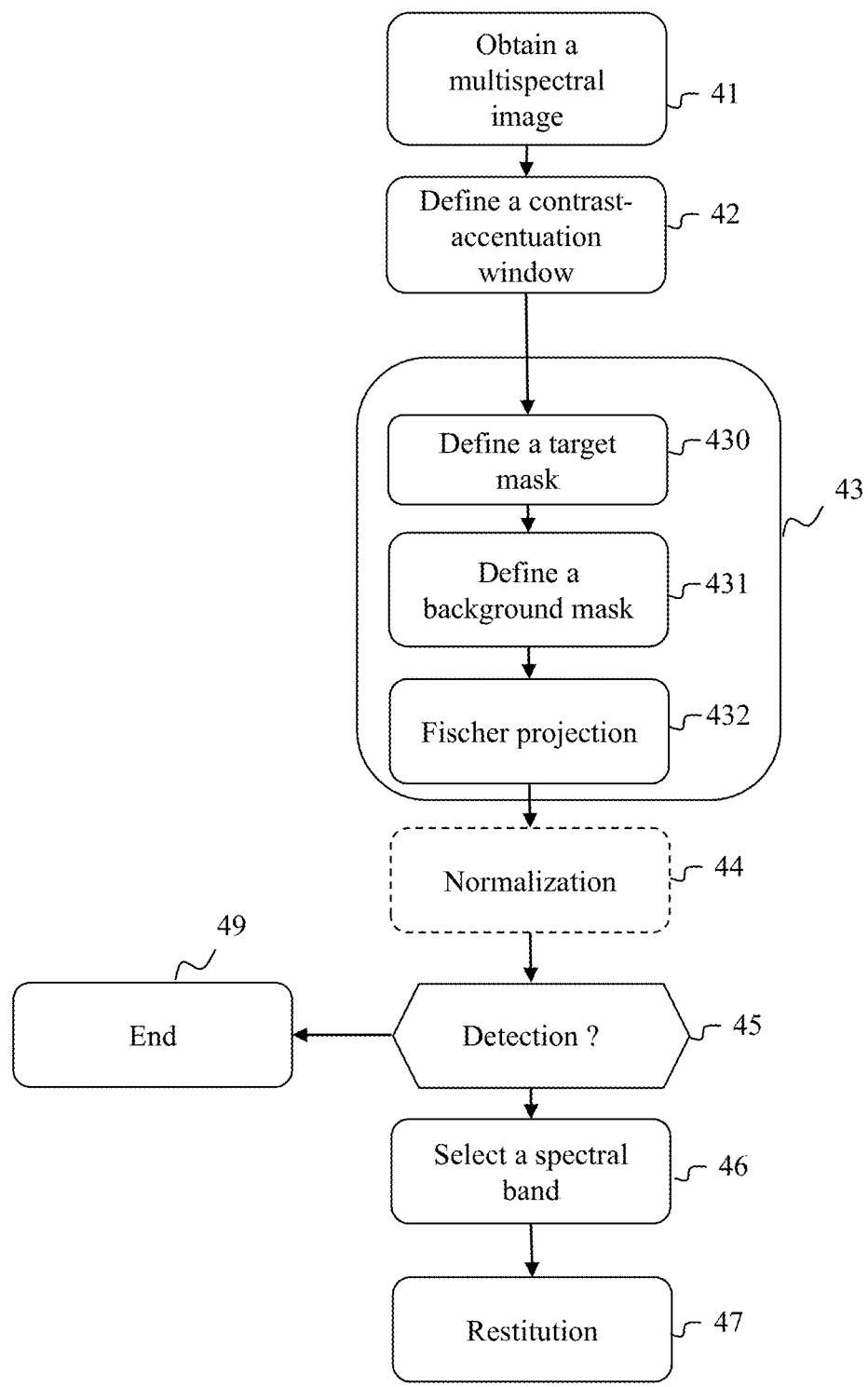
FIG. 4 illustrates schematically a method for viewing a laser spot in a multispectral image according to the invention.

The processing module 52 receives multispectral images from the image-acquisition device 51 and applies to them a processing that is described in relation to FIG. 4. The processing module 52 is detailed in relation to FIG. 2B.

For each multispectral image, the processing module 52 produces at least one image allowing viewing of a laser spot 8, referred to as restitution image, in which the laser spot 8 is clearly identifiable, and supplies this image to the image-viewing device 53, which displays it. The image-viewing device 53 is for example a screen or an eyepiece of the viewing system 5.

In the example in FIG. 1, a laser device 4 is fixed to the viewing system 5. This laser device 4 comprises a laser diode generating a laser beam 6 having for example a wavelength λ of 0.860 μm at a temperature of 20° C. This wavelength varies by a value Δλ according to a linear law as a function of the value ΔT of variation of the operating temperature of the laser diode with respect to the temperature of 20° C.

$$\Delta\lambda = \alpha \cdot \Delta T$$

where α is a constant equal to 0.3 nm/° C. For example, at 0° C. the wavelength λ=0.854 μm.

The laser device 4 enables an operator manipulating the viewing system 5 to designate a target by means of the laser spot 8 produced when the laser beam 6 encounters an object (for example here a copse).

Figure 2A:
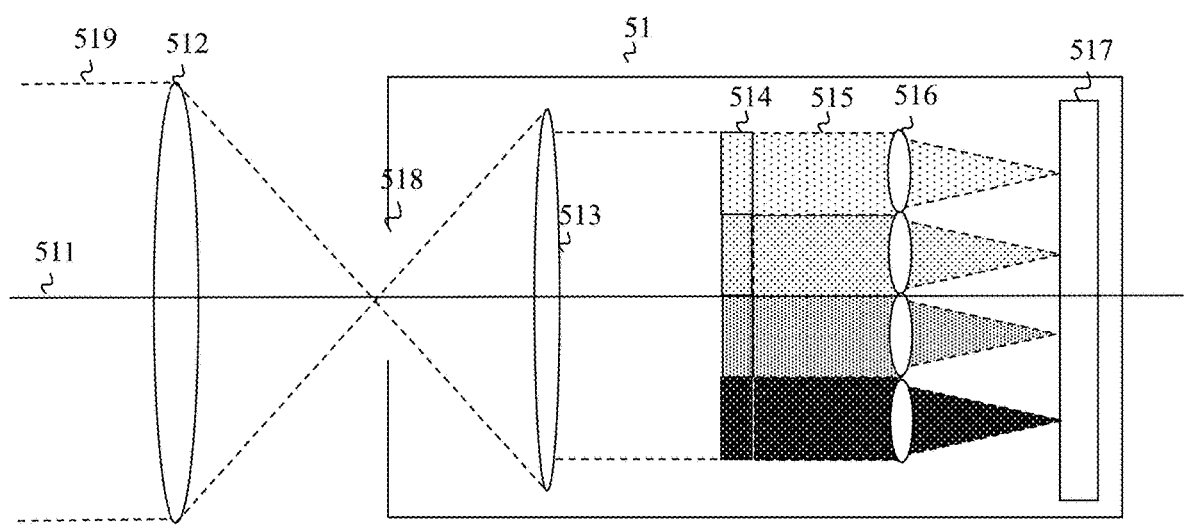
FIG. 2A illustrates schematically an example of an image-acquisition device included in a viewing system.

FIG. 2A illustrates schematically an example of an image-acquisition device included in a viewing system.

The image-acquisition device 51 receives a light beam 519, which it redirects to an image sensor 517 in order to create a plurality of multispectral images 3. To do this the image-acquisition device 51 comprises a primary lens 512, a field diaphragm 518, a secondary lens 513, a matrix of filters 514, a matrix of mini-lenses 516 and the image sensor 517.

The primary lens 512, the field diaphragm 518, the secondary lens 513, the matrix of filters 514, the matrix of mini-lenses 516 and the image sensor 517 are perpendicular to an optical axis 511. The assembly consisting of primary lens 512, diaphragm 518 and secondary lens 513 generates a collimated light beam from the light beam 519, the collimated beam representing the optical field 7 having a small angle of around 5°. The collimated light beam is received by the matrix of filters 514. The matrix of filters 514 is composed of a plurality of filters breaking down the light beam 519 into a plurality of spectral bands. For example, the matrix of filters 514 comprises 16 filters able to break down the light beam into 16 spectral bands. Providing a collimated light beam representing an optical field having a small angle allows to obtain a matrix of filters composed of filters that are highly selective in spectral bands and having a high level of out-of-band rejection. The "16" spectral bands are described hereinafter in relation to FIG. 3B. A plurality of light sub-beams 515 is then generated at the output of the matrix of filters 514 each corresponding to one of the spectral bands in the plurality of spectral bands. In the example described in relation to FIG. 2A, "16" light sub-beams are generated. Each light sub-beam in the plurality of light sub-beams 515 is next directed to a zone of the image sensor 515 by a mini-lens in the matrix of mini-lenses 516. The matrix of mini-lenses 516 therefore comprises as many mini-lenses as there are spectral bands generated by the matrix of filters 514 (i.e. "16" mini-lenses). The image sensor 517 is for example a CCD (charge-coupled device) sensor or a CMOS (complementary metal-oxide-semiconductor) sensor comprising a matrix of photosites able to transform incident light photons into an electrical signal. Sampling of the electrical signal at the image frequency of the image-acquisition device 51 makes it possible to form a pixel for each photosite. In one embodiment the image sensor 517 is a square matrix of (4×500)×(4×500) photosites able to produce images comprising (4×500)×(4×500) pixels. Each image produced by the image-acquisition device 51 is supplied to the processing module 52.

In one embodiment, the matrix of filters 514 comprises at least two identical filters. In this embodiment, a different polariser is positioned in front of each identical filter, so that each identical filter produces a light sub-beam representing the same spectral band but having a different polarisation. The use of a polariser allows better to detect laser spots that have been emitted with a certain polarisation.

Figure 2B:
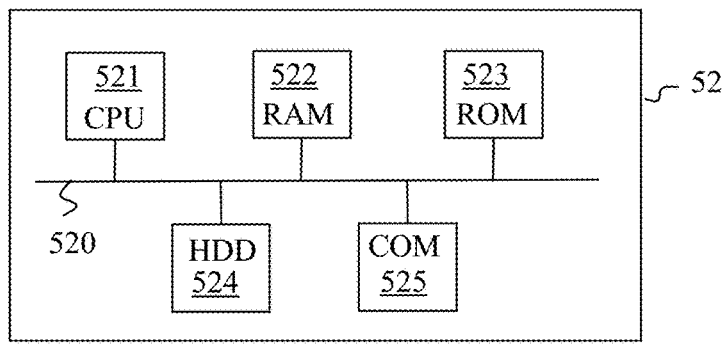
FIG. 2B illustrates schematically an example of hardware architecture of a processing module included in a viewing system.

FIG. 2B illustrates schematically an example of hardware architecture of a processing module included in a viewing system.

According to the example of hardware architecture shown in FIG. 2B, the processing module 52 then comprises, connected by a communication bus 520: a processor or CPU (central processing unit) 521; a random access memory (RAM) 522; a read only memory (ROM) 523; a storage unit such as a hard disk or a storage medium reader, such as an SD (secure digital) card reader 524; at least one communication interface 525 enabling the processing module to communicate with the image-acquisition device 51 and/or the image-viewing device 53.

In an embodiment in which the image-acquisition device 51, the processing module 52 and the viewing device 53 are separate and distant, the image-acquisition device 51 and the viewing device 53 also comprise a communication interface able to communicate with the communication interface 525 by means of a network such as a wireless network.

The processor 521 is capable of executing instructions loaded into the RAM 522 from the ROM 523, from an external memory (not shown), from a storage medium (such as an SD card) or from a communication network. When the processing module 52 is powered up, the processor 521 is capable of reading instructions from the RAM 522 and executing them. These instructions form a computer program causing the implementation, by the processor 521, of all or part of the method described below in relation to FIGS. 4, 5A and 5B.

Figure 5A:
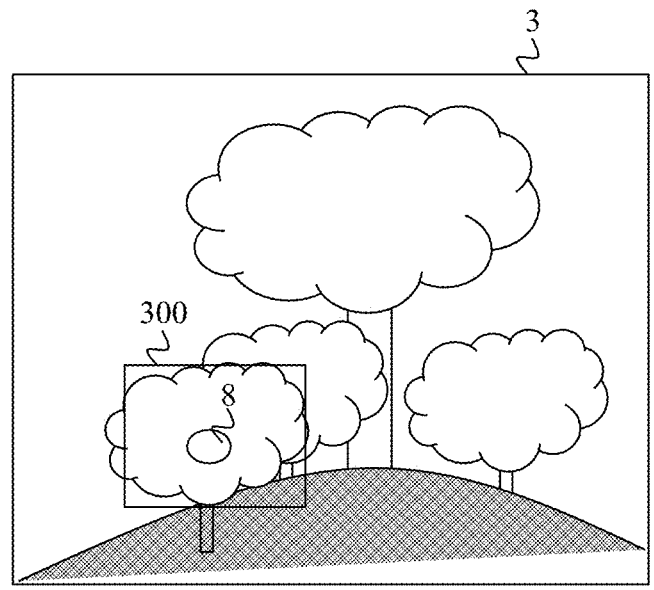
FIG. 5A illustrates schematically a step of definition of a contrast-accentuation window in a multispectral image.
Figure 5B:
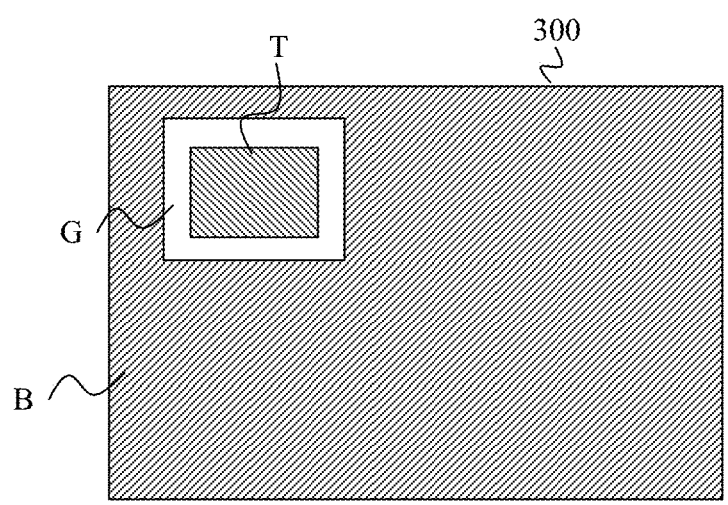
FIG. 5B illustrates schematically a step of definition of masks used in a procedure allowing to accentuate a contrast between a laser spot and a background.

The method described below in relation to FIGS. 4, 5A and 5B may be implemented in software form by the execution of a set of instructions by a programmable machine, for example a DSP (digital signal processor), a microcontroller or a GPU (graphics processing unit), or be implemented in hardware form by a machine or a dedicated component, for example an FPGA (field-programmable gate array) or an ASIC (application-specific integrated circuit).

It should be noted that, in one embodiment, the processing module 52 functions at the image frequency of the image-acquisition device 51. The processing module 52 therefore processes each multispectral image produced by the image-acquisition device 51.

Figure 3A:
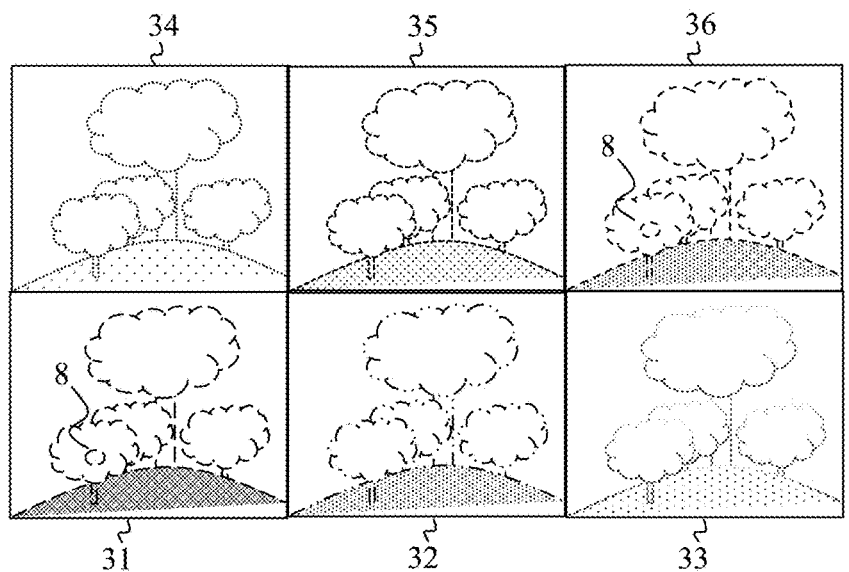
FIG. 3A illustrates schematically an example of an image produced by an image sensor of the image-acquisition device.

FIG. 3A illustrates schematically an example of an image produced by an image sensor 517 of the image-acquisition device 51.

The image described in relation to FIG. 3A is an image as obtained at the output of the image-acquisition device 51. In one embodiment, this image takes the form of a matrix of thumbnails 31 to 36. Each thumbnail results from a focusing, on the image sensor 517 by a mini-lens in the matrix of mini-lenses 516, of a light sub-beam in the plurality of light sub-beams 515 supplied by the matrix of filters 514. In one embodiment, each thumbnail 31 to 36 corresponds to a spectral band in the plurality of spectral bands and represents the optical field 7. According to the wavelength of the laser beam 6, the laser spot 8 is generally visible in one to three contiguous spectral bands in the plurality of spectral bands (an appearance of the laser spot 8 in more than three bands is however possible). The laser spot 8 therefore generally appears in one to three thumbnails 31 to 36. In the example described in relation to FIG. 3A, the laser spot 8 is visible in the thumbnail 31 and the thumbnail 36, the thumbnails 31 and 36 representing contiguous spectral bands. On the other hand, the laser spot 8 is not very visible or even invisible in the thumbnails 32, 33, 34 and 35.

In the example in FIG. 3A, in order to simplify the representation, the matrix of thumbnails is composed of six contiguous thumbnails. In the example where the plurality of spectral bands comprises 16 spectral bands and the image sensor 517 comprises (4×500)×(4×500) photosites, the matrix of thumbnails comprises four columns of four thumbnails of size (4×500)×(4×500) pixels.

It should be noted that, as soon as it receives an image coming from the image-acquisition device 51, the processing module 52 transforms this image into a multispectral image 3. To do this, the processing module 52 matches each pixel situated at the same spatial position in each thumbnail, in order to obtain a multispectral image 3 having the size of a thumbnail and in which each pixel has a number of components equal to the number of spectral bands in the plurality of spectral bands. Each component of each pixel therefore corresponds to a value of said pixel in a spectral band.

It is assumed here that the thumbnails 31 to 36 in the matrix of thumbnails are harmonised spatially, i.e. the thumbnails are adjusted with respect to each other so that all the pixels situated at the same spatial position in the thumbnails 31 to 36 correspond to the same spatial position in the scene 1.

In addition, it should be noted that each component of a pixel of the multispectral image 3 corresponds to the same instant in time since all the thumbnails that supplied a component were acquired by the same image sensor 517 at the same instant.

Obtaining a multispectral image 3 in which each pixel component corresponds to the same instant in time allows not to have to manage variations in brightness in the scene between the components (i.e. the spectral bands). In addition, acquisition of all the thumbnails 31 to 36 in the matrix of thumbnails by the same sensor at the same instant in time allows to obtain thumbnails on which the same spectro-spatial gain has been applied, to guarantee a fill rate of the pixels associated with the laser spot 8 and to guarantee a contrast between the pixels associated with the laser spot 8 and the pixels corresponding to the background (i.e. pixels not belonging to the laser spot 8) for example of around 15 dB.

In one embodiment, at least two contiguous thumbnails in the matrix of thumbnails have a non-void intersection. In this case, in order to avoid any incoherence, each pixel of a thumbnail belonging to an intersection between at least two thumbnails is ignored when the multispectral image 3 is created.

In the embodiment where these two filters in the matrix of filters 514 are identical and preceded by different polarisers, at least two thumbnails correspond to the same spectral band but represent different polarisations of the same light sub-beam. Each pixel of the multispectral image then has at least two components corresponding to the same spectral band but representing different polarisations.

Figure 3B:
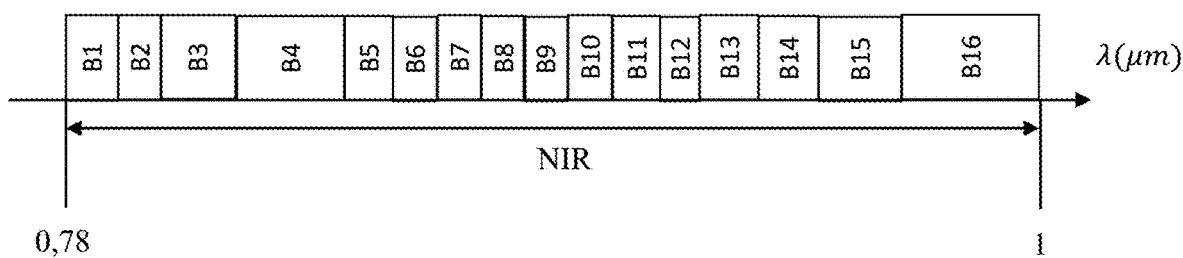
FIG. 3B illustrates schematically an example of a set of spectral bands continuously covering a spectral domain.

FIG. 3B illustrates schematically an example of a set of spectral bands continuously covering a spectral domain.

One particularity of spectral bands used in the invention is that they continuously cover a spectral domain. The spectral domain is situated, for example, in the near infrared (NIR) domain. As seen above, the wavelength of the laser spot 8 depends on an operating temperature of the laser device 4. The wavelength of the laser device 4 therefore takes values in a range of wavelengths dependent on operating temperatures provided for the laser device 4. The spectral domain therefore comprises said range of wavelengths in which the laser spot 8 may be situated. Each spectral band corresponds to one of the spectral bands supplied by the matrix of filters 514. According to the example described above, the spectral domain is therefore broken down into 16 spectral bands B1 to B16. The spectral bands are of variable widths. The width of each spectral band may for example be adapted according to parts of the spectral domain in which precision is required. A narrow spectral band may for example be defined in a part of the spectral domain where the laser spot is expected.

In one embodiment, the spectral bands are of equal widths.

In one embodiment, the spectral domain is situated between 0.7 µm and 1.1 µm and in this case the width of the spectral bands is 25 nm, or between 0.72 µm and 0.88 µm; in this case the width of the spectral bands is 10 nm, or between 0.78 µm and 0.94 µm; in this case the width of the spectral bands is 10 nm.

In one embodiment the spectral domain is situated between 0.8 μm and 1.5 μm, in this case the width of the spectral bands is 25 nm and the image-acquisition device 51 is suitable for supplying 25 spectral bands.

In one embodiment, at least two spectral sub-bands in the plurality of spectral sub-bands have a non-void intersection.

FIG. 4 illustrates schematically a method for viewing a laser spot in a multispectral image according to the invention.

One objective of the method described in relation to FIG. 4 is to supply to an operator looking in the image-viewing device 53 an image in which pixels corresponding to the laser spot 8 are clearly distinguished with respect to a background of the image, the background in an image being considered here to be any pixel of said image not corresponding the laser spot 8. To do this, said method is based on a contrast-accentuation procedure.

In a step 41, the processing module 52 obtains a multispectral image 3 of the image-acquisition device 51.

In a step 42, the processing module 52 defines a contrast-accentuation window 300 corresponding to a subpart of the multispectral image 3 comprising the laser spot 8. The contrast-accentuation window 300 is used to locally accentuate, in the multispectral image 3, a contrast between the pixels of the multispectral image 3 corresponding to the laser spot 8 and the pixels of the multispectral image 3 corresponding to the background. FIG. 5A illustrates schematically a step of defining a contrast-accentuation window in a multispectral image. FIG. 5A represents the multispectral image 3 in which the contrast-accentuation window 300 is positioned. The contrast-accentuation window is positioned so that it comprises the laser spot 8. In one embodiment, the operator positions the contrast-accentuation window 300 so that this window comprises the laser spot 8. In addition, the operator fixes the shape and size of the contrast-accentuation window 300 according, for example, to a contrast in which the laser spot 8 is situated. An example of a criterion for fixing the shape and size of the contrast-accentuation window 300 is for example that, outside the laser spot 8, the contrast-accentuation window 300 is as homogeneous as possible. In one embodiment, the operator defines a square contrast-accentuation window 300 of one hundred pixels on each side. During step 42, coordinates of the contrast-accentuation window 300 in the multispectral image 3, such as the coordinates of the top left pixel in said window, and the size of said window are saved in memory by the processing module 52.

In a step 43, the processing module applies a contrast-accentuation procedure comprising steps 430, 431 and 432.

During step 430, the processing module 52 defines a mask of pixels suitable for containing the pixels of the multispectral image 3 corresponding to the laser spot 8 referred to as the target mask T. Knowing characteristics of the laser system 4, it is possible to know the size of the laser spot 8 in the multispectral image 3. In this way, it is possible to adapt the shape and/or size of the target mask T to the shape and size of the laser spot 8. In one embodiment, the target mask T is square and the size of the target mask T depends on the size of the laser spot 8. In one embodiment, three target masks T are available to the processing module 52, a square mask with sides of three pixels, a square mask with sides of four pixels and a square mask with sides of seven pixels. The processing module 52 then chooses the smallest target mask T that can fully contain the laser spot 8, the size of the laser spot 8 being a parameter given by the operator.

During step 431, the processing module 52 defines a mask of pixels corresponding to the background in the window 300 (i.e. a mask of pixels not corresponding to the laser spot 8), referred to as the background mask B. In one embodiment, the background mask B is a mask complementary to the target mask T, i.e. all the pixels of the contrast-accentuation window 300 that do not belong the target mask T belong to the background mask B.

In one embodiment, a zone G corresponding to a band of a few pixels around the target mask T separates the target mask T from the background mask B. The zone G allows to avoid taking into account, during a contrast accentuation, poorly defined pixels, i.e. pixels that cannot be clearly defined as belonging to the laser spot 8 or to the background. The background mask B therefore corresponds to all the pixels of the window 300 belonging neither to the target mask T nor to the zone G. FIG. 5B illustrates schematically a step of definition of target mask T and background mask B used in a procedure allowing to accentuate a contrast between a laser spot and a background. A rectangular target mask T is placed at the top left of the contrast-accentuation window 300. The target mask T is surrounded by a zone G. A background mask B corresponds to all the pixels of the contrast-accentuation window 300 belonging neither to the target mask T nor to the zone G.

During step 432, the processing module 52 applies a Fischer projection to the pixels of the contrast-accentuation window 300. A method for applying a Fischer projection described in the article "*Some practical issues in anomaly detection and exploitation of regions of interest in hyperspectral images*" by F. Goudail et al., Applied Optics, Vols. 45, No. 21, pp. 5223-5236 is used. The method for applying a Fischer projection allows to accentuate the contrast between the pixels belonging to the target mask T and the pixels belonging to the background mask B. This method consists of projecting each pixel of the contrast accentuation window 300 on an optimum direction in a multidimensional space where each dimension corresponds to intensity values in a spectral band of the multispectral image 3. In the example described above in which each pixel of the multispectral image 3 comprises 16 intensity values (i.e. one intensity value per spectral band), the multidimensional space is a space with 16 dimensions. It is assumed here that the values in each spectral band of each pixel corresponding to the mask T (or respectively to the background mask B) are random variables, spatially non-correlated, and having a Gaussian probability density with an average of $m_T$ (or respectively $m_B$) and of covariance matrix $\Gamma$. The aforementioned article mentions methods for estimating the average $m_T$ (or respectively $m_B$) and the covariance matrix $\Gamma$.

The optimum projection direction, represented by a vector u, can be determined from the covariance matrix F in accordance with the following formula:

$$u = \Gamma^{-1}(m^T - m^B)$$

where $m^T$ (and respectively $m^B$) is an average pixel representing the pixels corresponding to the mask T (and respectively to the mask B).

$$m^T = \{m_1^T, m_2^T, \ldots, m_K^T\}$$

$$m^B = \{m_1^B, m_2^B, \ldots, m_K^B\}$$

where $m_k^T$ (and respectively $m_k^B$), with $k \in [1; K]$, is an intensity value of the average pixel $m^T$ (and respectively $m^B$) in a spectral band k, and K is the number of spectral sub-bands in the plurality of spectral bands (here K=16).

$$m_k^T = \frac{1}{N_k^T} \sum_{i \in T} p_k^T(i)$$

$$m_k^B = \frac{1}{N_k^B} \sum_{i \in B} p_k^B(i)$$

where $p_k^T(i)$ (and respectively $p_k^B(i)$) is an intensity value in a spectral band k of an $i^{th}$ pixel $p^T(i)$ corresponding to the target mask T (and respectively to the background mask B), and $N_k^T$ is a number of pixels corresponding to the target mask T (and respectively to the background mask B).

The projection on the vector u is the Fischer projection and amounts to seeking a maximum correlation between variations in intensity values present in the spectral bands of the plurality of spectral bands.

Each pixel p(i) of the contrast-accentuation window 300 is projected in accordance with the Fischer projection:

$$f(i) = u^T \cdot p(i)$$

where f(i) is a pixel of a Fischer projection window F corresponding to a result of an application of the Fischer projection to the contrast-accentuation window 300. The Fischer projection window F has a shape and size identical to the contrast-accentuation window 300.

After the execution of step 432, the processing module 52 has obtained the vector u representing the optimum projection direction and the Fischer projection window F.

In a step 45, the processing module 52 determines whether a laser spot appears in the Fischer projection window F. To do this, the processing module 52 calculates a value representing the contrast between the pixels of the target mask T and the pixels of the background mask B in the Fischer projection window F. A value representing the contrast between the pixels of the target mask T and the pixels of the background mask B in the Fischer projection window F can be calculated in the form of a signal-to-noise ratio in the following manner:

$$C = \sqrt{\frac{(m^T - m^B)^2}{(\sigma^B)^2}}$$

where $\sigma^B$ is a standard deviation of the intensity values of the pixels corresponding to the mask B in the Fischer projection window F, and $m^T$ (and respectively $m^B$) is an average of the intensity values of the pixels of the target mask T (and respectively of the background mask B). The processing module 52 next compares the signal-to-noise ratio C with a threshold signal-to-noise ratio $C_s$. The threshold signal-to-noise ratio $C_s$ may be fixed for example so as to guarantee a contrast between the pixels associated with the laser spot 8 and the pixels corresponding to the background of around 15 dB. When $C<C_s$ the processing module determines that no laser spot appears in the Fischer projection window F. In this case the processing module 52 executes a step 49, during which the processing module ends the process of viewing a laser spot for the contrast-accentuation window 300 defined during step 42.

When $C \geq C_s$ the processing module determines that laser spot appears in the Fischer projection window F. In this case the processing module executes a step 46.

In step 46, the processing module selects a spectral band, referred to as the best spectral band, offering the best contrast between the pixels of the target mask T and the pixels of the background mask B using at least one result of the contrast-accentuation procedure executed in step 43. The contrast-accentuation procedure allowed to obtain the vector u representing the optimum projection direction. The vector u has as many dimensions as there are components of the multispectral image. In the embodiment where the multispectral image has 16 components, the vector u is a vector with 16 dimensions. When each component corresponds to a different spectral band, each dimension of the vector u corresponds to one of said spectral bands. Each dimension of the vector u is associated with a coordinate value. When one coordinate value is very much greater than the other coordinate values, it can be considered that the spectral band associated with the corresponding dimension of the vector u is the one that offers the best contrast between the pixels of the target mask T and the pixels of the background mask B. In some cases a plurality of coordinate values are equal and greater than the other coordinate values. In this case, any one of the spectral bands associated with the corresponding dimension of the vector u gives a good contrast between the pixels of the target mask T and the pixels of the background mask B. In one embodiment, the processing module 52 selects the spectral band associated with the highest coordinate value of the vector u. When a plurality of coordinate values are equal and greater than the other coordinate values, the processing module 52 randomly selects a spectral band corresponding to one of the coordinate values of the vector u greater than the other coordinate values. The spectral band thus selected becomes the best spectral band.

In a step 47, the processing module 52 generates a restitution image comprising the laser spot 8 and intended to be displayed by the image display device 53.

To do this, the processing module 52 forms a monospectral window (i.e. a window where each pixel has one component) by extracting from the contrast-accentuation window 300 the component corresponding to the best spectral band selected during step 46. The monospectral window is next inserted in a receiving image representing the scene 1 at a position corresponding to the position of the contrast-accentuation window 300.

In one embodiment, the receiving image is a thumbnail from the matrix of thumbnails. The thumbnail chosen may for example be a thumbnail in which the laser spot 8 does not appear or appears only a little, such as for example the thumbnails 32, 33, 34 or 35, or in a thumbnail in which the contrast between the pixels of the laser spot 8 and the pixels of the background is great.

In one embodiment, the processing module 52 reconstructs a receiving image from a subset of spectral bands in the plurality of spectral bands.

In one embodiment, the receiving image is supplied by another image-acquisition device supplying for example images representing the visible domain or by a thermal-image acquisition device, the images supplied by the other image-acquisition device or by the thermal-image acquisition device representing the optical field 7.

The restitution image is next displayed to an operator by means of the image display device 53.

In one embodiment, during step 44, the processing module 52 normalizes the vector used so as to obtain a normalized vector $u_n$ having coordinate values situated in the same range of values, for example between zero and one. The normalized vector $u_n$ is next used during step 45 to select the best spectral band. The use of normalized coordinate values allows a more effective comparison of said coordinate values and thus allows to determine more rigorously the highest coordinate value.

In one embodiment, the processing module calculates a value representing a contrast between the pixels of the target mask T and the pixels of the background mask B for each component of the contrast-accentuation window 300 in the form of a signal-to-noise ratio $C_k$:

$$C_k = \sqrt{\frac{(m_k^T - m_k^B)^2}{(\sigma_k^B)^2}}$$

where $\sigma_k^B$ is a standard deviation of the intensity values of the pixels corresponding to the mask B in the spectral sub-band k.

In this embodiment, during step 46, the processing module 52 selects the best spectral band on the basis of the coordinates of the normalized vector $u_n$ and the calculated values $C_k$. In one embodiment, the processing module calculates, for each spectral band, a value, referred to as the selection value, corresponding to a linear combination between the value of coordinates of the normalized vector $u_n$ and the value $C_k$ associated with said spectral band. In one embodiment, the selection value for a spectral band corresponds to a result of a weighting of the coordinate value of the normalized vector $u_n$ associated with said spectral band by the value $C_k$ associated with said spectral band.

In one embodiment, in step 46, the processing module 52 selects a second spectral band in which the laser spot 8 does not appear or only a little. This second spectral band is for example a spectral band for which the value representing the contrast $C_k$ associated with said spectral band is less than a second threshold signal-to-noise ratio $C_s'$. The second threshold signal-to-noise ratio $C_s'$ may be fixed for example so as to guarantee a contrast between the pixels associated with the laser spot 8 and pixels corresponding to the background of less than 2 dB. In one embodiment, the second spectral band is a spectral band from the plurality of spectral bands for which $C_k < C_s'$ as close as possible to the best spectral band. In this embodiment, during step 47, the processing module 52 forms a second monospectral window by extracting from the contrast-accentuation window 300 the component corresponding to the second spectral band. The processing module 52 next selects which monospectral window to insert in the receiving image. For example, for each multispectral image, the processing module 52 supplies a receiving image comprising the first or second monospectral window so that the image-viewing device 53 displays alternately a receiving image comprising the first or second monospectral window with a predefined frequency less than or equal to the image frequency of the image-acquisition device. For example, the processing module supplies a receiving image comprising a first monospectral window for one second and then a receiving image comprising a second monospectral window for one second, and so on. By displaying alternately the two monospectral windows, an operator is enabled to better identify the laser spot 8 and to have a better understanding of the scene in which the laser spot 8 appears, and in particular to differentiate the laser spot 8 from local specular reflections in said scene.

In one embodiment, referred to as automatic mode, it is not an operator that defines the position of the contrast-accentuation window 300 and the position of the target mask T. A plurality of positions of the contrast-accentuation window 300 are tested successively in the multispectral image 3 by the processing module 52. For example, the contrast-accentuation window 300 is moved in the multi-component image 3 so that each pixel of the multispectral image 3 appears at least once in the contrast-accentuation window 300. For each position of the contrast-accentuation window 300 tested, the processing module executes the contrast-accentuation procedure described in relation to step 43. In this case, during step 430, the target mask T is defined automatically so that it is positioned at the centre of the contrast-accentuation window 300. Following the execution of the contrast-accentuation procedure, the processing module 52 selects one of the Fischer projection windows F obtained and applies step 45 using the results of the Fischer projection corresponding to the Fischer projection window F selected. For example, the processing module 52 selects the Fischer projection window F displaying the greatest contrast between the pixels corresponding to the target mask T and the pixels corresponding to the background mask B. In this case it is considered that the Fischer projection window F displaying the greatest contrast between the pixels corresponding to the target mask T and the pixels corresponding the background mask B is, among all the Fischer projection windows F, the one that allows to obtain the best possible restitution image. Steps 46 and 47 are applied subsequently.

In one embodiment of the automatic mode, the processing module takes advantage of the temporal correlations between the successive multispectral images in order to define positions of the contrast-accentuation window 300 where the laser spot 8 is to be sought. In this embodiment, the various positions of the contrast-accentuation window 300 tested by the processing module 52 in a multispectral image are situated in the vicinity of the position of the Fischer projection window F displaying the greatest contrast between the pixels corresponding to the target mask T and the pixels corresponding to the background mask B in the previous multispectral image. In one embodiment, the processing module 52 tests only one position of the contrast-accentuation window 300 in a multispectral image corresponding to the position of the Fischer projection window F displaying the greatest contrast between the pixels corresponding to the target mask T and the pixels corresponding the background mask B in the previous multispectral image.

In one embodiment following the identification of the best spectral band, the processing module 52 determines the type of laser device 4 that produced the laser spot 8. To do this, the processing module 52 has in memory a set of spectral bands, each associated with a known type of laser device. By comparing the characteristics of the best spectral band with the characteristics of the spectral bands in said set, the processing module 52 can determine the type of laser device 4. In this embodiment, when the laser spot 8 is an intermittent laser spot, the processing module determines the frequency of the laser spot 8 over a plurality of successive multispectral images. It is assumed here that the image frequency of the image-acquisition device 51 is sufficiently greater than the frequency of the laser spot 8 to capture each appearance of the laser spot 8. In this case, the processing module also stores in memory information representing laser spot frequencies of known laser device types. The processing module can thus determine more finely the type of laser device 4 by using the characteristics of the best spectral band and the frequency of the laser spot 8.

The invention claimed is:

1. A method for viewing a laser spot included in a multispectral image, comprising a plurality of components and representing an optical field, the laser spot being produced by a laser device and having a wavelength taking values in a range of wavelengths dependent on operating temperatures of the laser device, wherein the method comprises:

obtaining a multispectral image in which each component corresponds to the same instant of acquisition and represents a spectral band in a plurality of spectral bands covering continuously a spectral domain comprising said range of wavelengths;

applying a contrast-accentuation procedure to a first window corresponding to a subpart of the multispectral image comprising the laser spot, the contrast-accentuation procedure comprising:

defining in the first window a first mask suitable for containing pixels of the multispectral image corresponding to the laser spot and a second mask suitable for containing pixels of the multispectral image not corresponding to the laser spot; and determining a vector representing a Fischer projection direction making it possible to accentuate a contrast between the pixels of the first and second masks and applying a projection according to said vector to the first window in order to obtain a second window;

if the laser spot appears in the second window, selecting a first spectral band offering the best contrast between the pixels of the first and second masks using at least one result of the contrast-accentuation procedure and forming a third window from a component of the first window corresponding to the first spectral band selected;

generating an image allowing display of the laser spot by inserting the third window at a position corresponding to the first window in a receiving image representing the optical field.

2. The method according to claim 1, wherein a comparison of a value representing a contrast between the pixels of the first and second masks in the second window with a first threshold makes it possible to determine whether the laser spot appears in the second window.

3. The method according to claim 1, wherein the values of coordinates of said vector are values of coordinates normalized over a predefined range of values.

4. The method according to claim 1, further comprising selecting a second spectral band, said second spectral band being associated with a contrast value between the pixels of the first and second masks lower than a second threshold and forming a fourth window from a component of the first window corresponding to the second spectral band selected, the image allowing viewing of the laser spot being generated by inserting the third or fourth window in a receiving image representing the optical field.

5. The method according to claim 1, wherein characteristics of the first spectral band allow to determine a laser device type.

6. A computer program product embodied in a non-transitory computer readable medium, the computer program product comprising instructions for the implementation, by a device, of the method according to claim 1, when said program is executed by a processor of said device.

7. A non-transitory storage medium storing a computer program comprising instructions for the implementation, by a device, of the method according to claim 1, when said program is executed by a processor of said device.

8. A non-transitory storage medium storing a computer program comprising instructions for the implementation, by a device, of the method according to claim 1, when said program is executed by a processor of said device.

9. The method according to claim 1, wherein the multispectral image is generated from a plurality of thumbnails representing the optical field having the same acquisition instant and harmonised spatially, each thumbnail corresponding to a spectral band from the plurality of spectral sub-bands.

10. The method according to claim 9, wherein at least two thumbnails from the plurality of thumbnails correspond to the same spectral band and represent a light beam corresponding to said spectral band polarised according to a different polarisation, so that, when the first spectral band offering the best contrast between the pixels of the first and second masks is selected, the polarisation offering the best contrasts between the pixels of the first and second masks is also selected.

11. A method for viewing a laser spot included in multispectral images acquired with a predefined image frequency, wherein the method comprises:

executing the method according to claim 1 for each multispectral image.

12. A computer program product embodied in a non-transitory computer readable medium, the computer program product comprising instructions for the implementation, by a device, of the method according to claim 11, when said program is executed by a processor of said device.

13. The method according to claim 1, wherein values representing a contrast between the pixels of the first and second masks in each spectral band are used for selecting the spectral band offering the best contrast between the pixels of the first and second masks, said values representing a contrast comprising values of coordinates of said vector.

14. The method according to claim 13, wherein said values representing a contrast further comprise signal-to-noise ratio values calculated for each spectral band.

15. The method according to claim 13, wherein a selection value is calculated for each spectral band from each value representing a contrast corresponding to said spectral band, the first spectral band being selected by taking a spectral band from the plurality of spectral bands associated with the highest selection value among the selection values calculated.

16. The method according to claim 1, wherein the contrast-accentuation procedure is applied to a plurality of first windows corresponding to different subparts of the multispectral image, at least one first window from said plurality comprising the laser spot, and in that a second window is selected in accordance with a predefined criterion from the second windows obtained during each application of the contrast-accentuation procedure, the second window selected being used for selecting the first spectral band.

17. The method according to claim 16, wherein a position of at least one first window is defined in a multispectral image, referred to as the current image, according to a position of a second window in which the laser spot appears in a multispectral image preceding the current image.

18. The method according to claim 17, wherein a frequency of the laser spot is determined over a plurality of successive multispectral images, the frequency of the laser spot being used for determining the type of laser device.

19. The method according to claim 17, wherein the image allowing viewing of the laser spot is generated by alternating an insertion of the third or fourth window in a receiving image representing the optical field with a predefined alternation frequency less than or equal to the predefined image frequency.

20. A device allowing viewing of a laser spot included in a multispectral image, comprising a plurality of components and representing an optical field, the laser spot being produced by a laser device and having a wavelength taking values in a range of wavelengths dependent on operating temperatures of the laser device, wherein the device comprises circuitry adapted for:

obtaining a multispectral image in which each component corresponds to the same acquisition instant and represents a spectral band in a plurality of spectral bands covering continuously a spectral domain comprising said range of wavelengths;

applying a contrast-accentuation procedure to a first window corresponding to a subpart of the multispectral image comprising the laser spot, said application means comprising;

defining in the first window a first mask suitable for containing pixels of the multispectral image corresponding to the laser spot and a second mask suitable for containing pixels of the multispectral image corresponding to the laser spot and a second mask suitable for containing pixels of the multispectral image not corresponding to the laser spot;

determining a vector representing a Fischer projection direction making it possible to accentuate a contrast between the pixels of the first and second masks and means for applying a projection according to said vector to the first window in order to obtain a second window;

selecting a first spectral band offering the best contrast between the pixels of the first and second masks using at least one result of the contrast-accentuation procedure and means for forming a third window from a component of the first window corresponding to the first spectral band selected; and generating an image allowing viewing of the laser spot by inserting the third window at a position corresponding to the first window in a receiving image representing the optical field.

* * * * *